March 4, 1958

J. W. SMITH

PHOTOCELL MOUNT

Filed May 28, 1953

2,825,819

INVENTOR.
JAMES W. SMITH
BY
George H. Fisher
ATTORNEY

United States Patent Office 2,825,819
Patented Mar. 4, 1958

2,825,819

PHOTOCELL MOUNT

James W. Smith, Minneapolis, Minn., assignor to Minneapolis-Honeywell Regulator Company, Minneapolis, Minn., a corporation of Delaware Application May 28, 1953, Serial No. 358,030

8 Claims. (Cl. 250—239)

The present invention is concerned with a mount for a photo electric cell and in particular with a mount for a dome-shaped photo emissive cell having an envelope made up of a glass dome member sealed to a substantially flat cathode member and having an anode member extending through the glass member in a glass-to-metal seal and supported with respect to the cathode by means of this glass-to-metal seal.

It is common practice to use a photocell to view the flame of a fuel burner, and it has been found that the life of the cell will be appreciably shortened when the cathode surface of the cell is maintained at a high ambient temperature. The cell may be mounted within the blast tube of the burner and when so mounted the combustion air being blown into the fire box tends to cool the cell. However, the photocell mount often tends to shield the cell from this air and as a result the temperature of the cathode remains high. Also, since glass to metal seals are incapable of withstanding an appreciable force it is necessary to provide a mount for the photocell which will make electrical connection to the anode of this dome-shaped cell and still will not exert too great a force against the anode.

It is therefore an object of the present invention to provide a photocell mount for use with the dome-shaped photocell, which mount has a base member to conduct heat away from the cathode of the cell and spring clips adapted to engage the cathode of the cell, which mount also has a leaf spring mounted on the base member and insulated therefrom, the leaf spring making electrical contact with the anode of the photo electric cell.

It is a further object of the present invention to provide a novel combination of a photo emissive cell having a glass dome member terminating in a substantially flat metallic cathode member and having an anode member extending through the glass dome and spaced from the cathode member, and of a mount for the cell including a base member having an opening adapted to receive a portion of the cathode member and to frictionally hold the portion of the cathode member by means of spring clip means rigidly mounted to the base member, the mount also having a leaf spring electrically insulated from the base member but rigidly mounted thereon and contacting the anode of the photocell.

Figure 1:
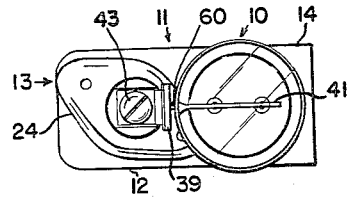
Figure 2:
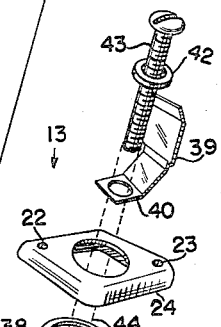
Figure 2:
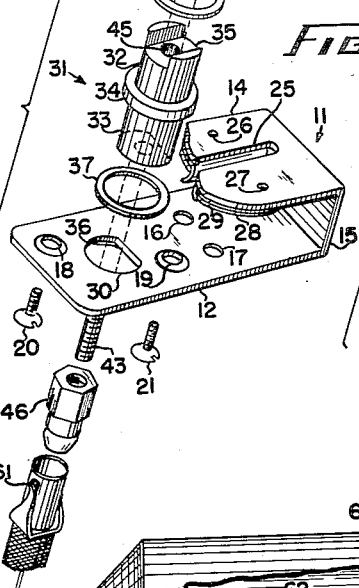
Figure 3:
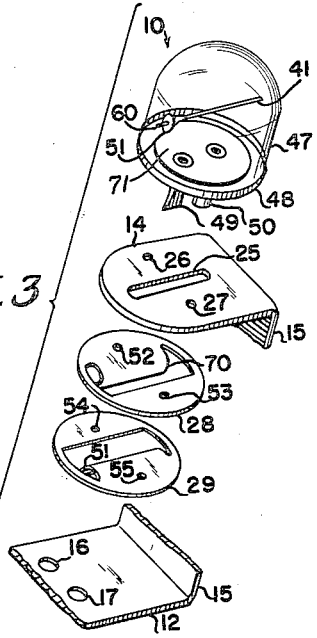
Figure 4:
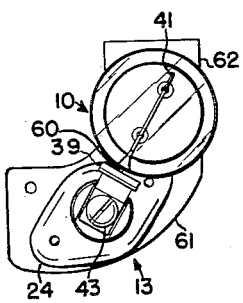
Figure 5:
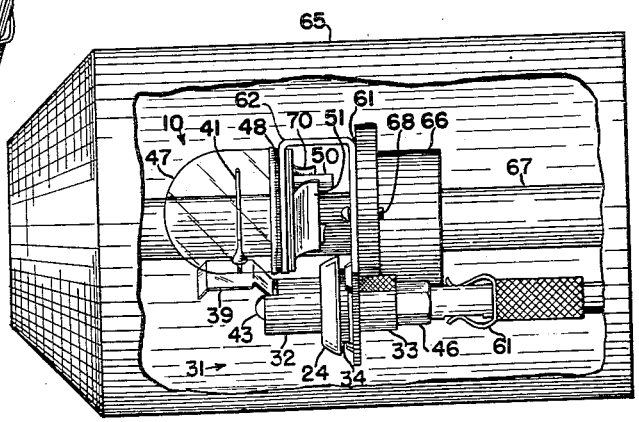

Further objects of the present invention will be apparent upon reference to the specification, claims and drawing of which;

Figure 1 is a side plan view of the improved photocell mount with the photocell mounted thereon, Figure 2 is an exploded view of the photocell mount of Figure 1 with a portion of the mount cut away and with the photocell removed, Figure 3 is an exploded view of the portion of the base member of the mount of Figure 1, showing the photo electric cell in position with respect to this portion of the mount, Figure 4 is a side plan view of a modification of the photocell mount wherein the base member is formed of a curved member, and Figure 5 is an elevational view of the photocell mount of Figure 4 mounted in the blast tube of a gun type oil burner with the photocell arranged to view the flame of the oil burner.

Referring specifically to Figure 1, the photocell mount is shown with the photocell positioned thereon, the assembly of the mount and photocell being positioned to view a light source directly above the plane of Figure 1. A photocell 10 is shown mounted on a base member 11 of the photocell mount, the lower portion 12 of the mount supporting a post assembly 13 and the upper portion 14 of the base member 11 supporting the photocell 10.

Figure 2, an exploded view of the mount of Figure 1, shows in detail the various members making up the post assembly 13 and also shows the exact structure of the base member 11. From Figure 2 it can be seen that the upper portion 14 of the base member 11 and the lower portion 12 are substantially parallel and are joined by a further portion 15 which is substantially at right angles to the upper and lower portions of the base member 11. This base member 11 is formed of a sheet of metal which has been stamped and bent to the form shown in Figure 2. Two openings 16 and 17 are stamped into the lower portion 12 of the base member to form a means for mounting the base member 11 to suitable mounting means. Countersunk openings 18 and 19 are also formed in the lower portion 12 of the base member and are adapted to receive bolts 20 and 21, which bolts mate with screw threaded holes 22 and 23 in a flanged retaining member 24, which member forms a part of the post assembly 13. The function of the member 24 will be discussed later.

An opening 30 is also formed in the lower portion 12 of the base member. This opening is substantially circular in shape with the exception of a flat surface 36. This flat surface is for the purpose of positioning an insulating post 31 which is a part of the post assembly 13. The reverse side of lower portion 33 of insulating post 31 has a plane surface machined thereon, this surface being shown in broken lines in Figure 2. Due to the plane surface on insulating post 31 and to the flat surface 36 in opening 30, the insulating post 31 can be inserted in opening 30 in only one position and this positions insulating post 31 correctly with respect to an opening 25 in the upper portion 14 of the base member 11.

The upper portion 14 of base member 11 has an elongated opening 25 stamped therein, this opening 25 being adapted to receive a portion of the cathode member of the photocell 10. The upper portion 14 of the base member is shown partially cut away in Figure 2 and reference can be made to Figure 3 to determine the true construction of this portion of the base member 11. In the stamping of the base member 11 a boss 26 and a boss 27 are formed. The bosses extend from the lower side of portion 14 of the base member 11 as viewed in Figure 2. The function of the bosses is to form a means of positioning bronze spring clips 28 and 29, which clips are shown more clearly in Figure 3.

The base member 11 and the bronze spring clips 28 and 29 are adapted to engage the cathode surface of the photocell 10 and to both conduct heat away from this cathode surface by means of the relatively large area of the metallic base member 11 and to also establish electrical contact to the cathode member. The portion 14 of base member 11 has substantially the same configuration as cathode 48 of photocell 10. Therefore the portion 14 conducts a maximum amount of heat away from the cathode without shielding photocell 10 from air current which may be circulating around photocell 10.

The post assembly 13, as shown in Figure 2, comprises an insulating post 31 having an upper portion 32 with a slot 35 formed therein, a lower portion 33, and a shoulder 34. The insulating post 31 is formed of a ceramic heat resistant material and is machined to the shape shown in Figure 2. The lower portion 33 of the insulating member 31 is for the most part cylindrical in shape to mate with the contour of opening 30 in the lower portion 12 of base member 11. However, the reverse side of the lower portion 33, as shown in Figure 2, has a plane surface machined thereon to mate with the flat surface 36 of opening 30 in the lower portion 12 of base member 11.

Resilient gaskets 37 and 38 are provided and form a cushion for the shoulder 34 of insulating post 31. The gasket 37 seats between the lower portion 12 of the base member and the lower portion of shoulder 34 of insulating member 31. The gasket 38 seats between the upper portion of the shoulder 34 and the underside of the metallic flanged retaining member 24. Therefore, when both 20 and 21 are inserted through openings 18 and 19 in base member 11 and are tightened into the screw threaded holes 22 and 23 respectively in retaining member 24 the insulating post 31 is not subjected to excessive forces which may tend to cause the member to crack. The gaskets therefore provide a slightly resilient mounting so the post assembly can be assembled without breakage.

The post assembly 13 also includes a bronze spring clip member 39 which has a lower portion 40 adapted to mate with the groove 35 in insulating post 31. The groove 35 in insulating post 31 positions the spring clip 39 so that it engages the anode of the photocell to make electrical contact therewith and to exert a minimum of force against the anode wire. This anode wire is shown as member 41 of Figure 3.

A bolt 43 is provided and in the view of the photocell mount of Figure 2 the bolt is shown as broken and extending as shown by the broken line 44. Bolt 43 in assembled condition of post assembly 13 extends through a washer 42, through the portion 40 of the spring clip 39, through an opening 45 in the insulating post 31 and into the screw threaded member 46 of clip connector, for example, Rajah clip connector.

Referring to Figure 3, a showing is made of a portion of base member 11 of the photo electric cell mount where the lower portion 12 is partially broken away and the portion 15 of the base member 11 is broken and exploded. In this view the photocell 10 is shown having a glass dome member 47 terminating in a substantially flat cathode member 48 and having an anode 41 extending through the glass dome 47 in a glass-to-metal seal 51 and suspended within the enclosure of the cell 10 and spaced from the cathode member 48 by means of this glass-to-metal seal 51. First and second substantially parallel tube-like projections 49 and 50 extend outwardly from the cathode member 48 and form the means for mounting the photocell 10.

In the manufacture of the photocell 10, tube 50 contains the chemicals which are flashed to form a photo emissive surface 71 on the metallic cathode 48. The tube 49 is connected to a vacuum pump and is used to evacuate the interior enclosure of the photocell 10. After the manufacturing process has been completed the tube 49 is pinched off and therefore is formed as is shown in Figure 3.

The opening 25 in the upper portion 14 of the base member 11 is of larger area than the area defined by the tubes 49 and 50 of photocell 10 and is so constructed to allow for manufacturing tolerances in the positioning of these tubes, it being recognized that the photocell 10 will not have uniform spacing between the tubes and will not have tubes of uniform diameter. Therefore, the bronze spring clips 28 and 29 are necessary to engage the tubes 49 and 50 and hold the photo electric cell 10 rigidly with the cathode member 48 in engagement with the upper surface of the portion 14 of base member 11.

The bronze spring clips 28 and 29 are formed with lips 70 and 51 which extend below the opening 25 in the portion 14 of the base member and effectively reduce the area of the opening 25. Spring clips 28 and 29 are actually two identical members and as assembled and shown in Figure 3, the clips are displaced 180°. Upon assembly of spring clips 28 and 29 with the base member 11 the openings 52 and 53 in the spring clip 28 mate with boss 26 and boss 27 respectively of the base member 11 while the openings 54 and 55 of the spring clip 29 mate with boss 26 and boss 27 respectively. When the spring clips 28 and 29 are so assembled, the spring clips and the portion 14 of the base member 11 are spot welded so that the spring clips 28 and 29 are rigidly mounted on the base member 11. When photocell 10 is then positioned with the tubes 49 and 50 extending through the opening 25 the resilient lips 70 and 51 of spring clips 28 and 29 respectively engage the surfaces of the tubes 49 and 50 and frictionally hold the photo electric cell 10 in position on the base member 11, as is shown in Figure 5.

When the photocell 10 is thus held in position on the base member 11 the extension 60 of anode 41 engages the spring clip 39, as shown in Figure 1, thereby completing an electrical connection from the clip connector 61 through bolt 43 and clip member 39 to the anode 41.

Figure 4 is a showing of a modification of the photo electric cell mount of Figures 1, 2 and 3 wherein the base member is formed with the lower portion 61 curved rather than straight as shown in Figure 2. The upper portion of this base member 62 remains the same as shown and described with regard to Figures 1, 2 and 3, as does the post assembly 13. Since the post assembly 13, the photocell 10, and the spring clips 28 and 29 remain as described in connection with Figures 1, 2 and 3, these components of the mount will retain the same reference numerals used in Figures 1, 2 and 3.

Upon reference to Figure 5 the photocell mount of Figure 4 is shown mounted in the blast tube 65 of a gun type oil burner, with the mount and photo cell rigidly secured to a bracket 66 which is a part of the gun type oil burner and is secured to the oil pipe 67. In the view of Figure 5 the upper portion 62 and the lower portion 61 of the base member are shown and it can be seen that this member is formed in much the same manner as the base member 11 of Figure 2 with the exception that the lower portion 61 is curved as shown in Figure 4. The post assembly 13 mounts on the lower portion 61 of this base member in the same manner as described in connection with Figure 2 and in the view of Figure 5 the post assembly 13 is shown in the assembled condition, the various members of the assembly having the same reference numerals as given them in Figure 2.

Also, in Figure 5 the photo electric cell 10 is shown and the manner in which the lips 70 and 51 of the spring clips 28 and 29 respectively engage the tubes 50 and 49 of the cathode member 48 is clearly shown.

From the foregoing description it can be seen that I have provided a new and improved mount for a dome-shaped photocell, which mount provides maximum cooling of the cathode surface of the photo electric cell and exerts a minimum of force upon the anode of this cell.

While specific embodiments of the invention have been shown and described, it is to be understood that the particular modifications shown have been for illustration only and that modifications other than these will be readily obvious to those skilled in the art. Therefore, I intend to be limited solely by the scope of the appended claims of which I claim:

1. A photocell mount for use with a photocell having a first electrode member, a radiation transmissible hollow member mating with one side of the first electrode and forming an enclosure, and a second electrode within the enclosure and extending through the hollow member to form a means to electrically connect to a second member, comprising: a metallic base member having substantial heat dissipation properties having means, including a resilient member, to receive and frictionally hold the first electrode of the photocell in electrical and heat conductive relationship with said base member, said base member both conducting heat away from the first electrode and establishing electrical connection to the first electrode, and a spring mounted on said base but electrically insulated therefrom, said spring being adapted to contact the second electrode of the photocell to establish electrical connection therewith.

2. The combination comprising; a photocell having a first disc-like metallic electrode having a tube extending from one side thereof, a glass dome fastened to the other side of said first electrode and forming an enclosure, and a second metallic electrode spaced from said first electrode and protruding through said glass dome; and a base member constructed of metal and including means to engage said tube extending from one side of said first electrode, said base member being in intimate contact with said first electrode to establish an electrical connection to said first electrode and to conduct heat therefrom, and a metallic leaf spring mounted on said base member but electrically insulated therefrom, said leaf spring extending in a direction to engage said second electrode to establish an electrical connection to said second electrode.

3. A photocell mount for use with a photocell having a substantially flat photoelectric cathode, a glass dome secured to one side of the cathode to form an enclosure, a tube extending from the other side of the cathode and forming a means to mount the cell, and an anode within the enclosure and spaced from the cathode and extending through the glass dome a substantial distance away from the cathode, comprising; a metallic base member having first portion and a second portion, said first and second portions being substantially parallel and being joined by a further portion of said base member which is formed at substantially right angles to said first and second portions, and having an opening in said first portion adapted to receive the tube extending from the cathode of the photocell, said opening being formed substantially larger than the tube, spring clip means rigidly mounted on said first portion of said base in the proximity of said opening to effectively reduce the size of said opening and adapted to frictionally engage and hold the tube of the cathode, said base member having an opening in said second portion of said base member adapted to receive means for mounting said base member, a resilient leaf spring mounted on said base member but electrically insulated therefrom, said leaf spring extending substantially at right angles to said first portion of said base member, said leaf spring being adapted to establish electrical contact to the anode of the photocell, and terminal means connected to said leaf spring.

4. The combination comprising a photocell having a glass dome, an anode supported by said glass dome, a substantially flat photoelectric cathode sealed to the bottom of said glass dome and spaced from said anode, and a tube extending in an outward direction from said cathode; and a flat metallic base having substantially the same configuration as said cathode and having an opening of larger area than the cross sectional area of said tube and adapted to receive said tube, a pair of spring clips rigidly mounted to said base to effectively reduced area of said opening to less than the cross sectional area of said tube and adapted to hold said tube with said cathode in heat conducting engagement with said base member, said base member establishing electrical contact with said cathode and aiding in the dissipation of heat from said cathode, and a spring clip mounted on said base but insulated therefrom, said spring clip being biased toward said opening in said base and adapted to engage said anode to establish electrical contact therewith.

5. The combination comprising; a photocell having a glass dome shaped member, a first substantially flat electrode of relatively large area secured to said glass member to form an enclosure, a second electrode extending through said glass member, said second electrode being spaced from said first electrode, and a tube of relatively small cross sectional area formed as part of said second electrode; and a substantially flat metallic member of relatively large area, having an opening therein, a spring clip rigidly fastened to said metallic member to partially close said opening in said metallic member, said opening being adapted to receive said tube, said spring clip being adapted to engage and hold said tube with said first electrode in heat conducting engagement with said metallic member, and a leaf spring member rigidly mounted on said metallic member but electrically insulated therefrom, said spring member being inclined toward said opening and adapted to engage said first electrode of said photocell.

6. The combination comprising, a photoelectric cell having an envelope including a dome shaped glass member and a substantially flat metallic photoelectric cathode sealed to the end of said dome shaped member, said cathode having a pair of tube members extending therefrom, said tube members forming the means to adapt said cell to be evacuated and also forming means for mounting said cell, and an anode extending through said glass member and spaced from said cathode; and a base member of metal having good heat conductivity, said base member being substantially U-shaped and having a first and a second parallel portion, said first portion having an elongated opening therein, said opening being larger than the area defined by said tubes extending from said cathode and the distance between said tubes, said opening being adapted to receive said tubes, a pair of metallic spring clips rigidly fixed to said first portion of said base to effectively reduce the area of said opening in said first portion and adapted to frictionally engage said tubes of said cathode and to hold said cathode in engagement with said first portion of said base member, an opening in said second portion of said base member adapted to receive means for mounting said base member, and metallic leaf spring means mounted on said base member but electrically insulated therefrom, said leaf spring means extending above said first portion of said base member and being adapted to contact said anode.

7. The combination comprising, a photocell having an enclosure formed by a glass dome shaped member and a substantially flat metallic photoelectric cathode member, a metallic anode spaced from said cathode within said enclosure and extending through a glass to metal seal in said glass dome, and a plurality of tube members extending outwardly from said cathode; and a metallic base member having an upper surface upon which said cathode abuts, and having an opening in said base member to receive said tube members, spring clip means rigidly mounted on the lower surface of said base member and formed to overhang said opening to frictionally engage said tube member and hold said cathode in position abutting the upper surface of said base member, said base member establishing electrical contact to said cathode, said base member including means adapted to receive means to mount said base member, and a leaf spring rigidly mounted to said base but electrically insulated therefrom, said leaf spring extending over said upper surface of said base member and contacting said anode to establish electrical contact therewith.

8. A photocell mount for use with a dome shaped photocell having a glass dome member terminating in a substantially flat metallic electrode having a pair of substantially parallel metallic tube members extending outwardly therefrom and having a second electrode in the form of a metallic member extending through the glass dome and spaced from the photoelectric cathode, comprising; a metallic base member having a substantially flat surface adapted to receive the first electrode, and having an opening in said surface being substantially larger than the area defined by the pair of tube members extending from the first electrode, metallic spring clip means rigidly mounted on the under side of said flat surface, first and second lips formed on said spring clip means and extending under said opening in said surface to effectively reduce the area of said opening, said lips adapted to frictionally engage the tube members extending from the first electrode and to firmly hold the photocell with the first electrode abutting against said surface, and a post assembly rigidly mounted on said metallic base member and having a spring extending therefrom and an insulator electrically insulating said spring from said base member, said spring extending over said surface of said base member and being adapted to engage the second electrode of the photocell and establish electrical contact therewith.

References Cited in the file of this patent
UNITED STATES PATENTS

| | | |
|---|---|---|
| 1,325,865 | Shreeve | Dec. 23, 1919 |
| 1,660,827 | Anderson | Feb. 28, 1928 |
| 2,165,193 | Wilbur et al. | July 4, 1939 |
| 2,448,518 | Cashman | Sept. 7, 1948 |
| 2,636,128 | Vance | Apr. 21, 1953 |